United States Patent [19]

Mori et al.

[11] 4,328,195

[45] May 4, 1982

[54] PROCESS FOR DESULFURIZING COMBUSTION EXHAUST GASES

[75] Inventors: Toshikatsu Mori; Teruo Kumagai; Shinpei Matsuda, all of Hitachi; Tsukasa Nishimura; Yasuyuki Nishimura, both of Kure, all of Japan

[73] Assignee: Babcock-Hitachi, Ltd., Tokyo, Japan

[21] Appl. No.: 130,388

[22] Filed: Mar. 14, 1980

[30] Foreign Application Priority Data

Mar. 19, 1979 [JP] Japan ................................ 54-31929

[51] Int. Cl.³ .............................................. C01B 17/00
[52] U.S. Cl. .................................. 423/242; 423/166; 423/240; 423/490
[58] Field of Search .......... 423/242 A, 242 R, 244 A, 423/244 R, 166, 240, 210 M, 490

[56] References Cited

U.S. PATENT DOCUMENTS

| | | | |
|---|---|---|---|
| 3,031,262 | 4/1962 | Rosenbloom | 423/242 A |
| 3,888,968 | 6/1975 | Atsukawa et al. | 423/166 |
| 3,903,243 | 9/1975 | Atsukawa et al. | 423/166 |
| 3,961,021 | 6/1976 | Morita et al. | 423/166 |
| 4,166,838 | 9/1979 | Tatani et al. | 423/166 |

FOREIGN PATENT DOCUMENTS 742915  12/1969  Belgium ............................... 423/242

*Primary Examiner*—O. R. Vertiz
*Assistant Examiner*—Gregory A. Heller
*Attorney, Agent, or Firm*—Thomas E. Beall, Jr.

[57] ABSTRACT

An improved process for desulfurizing combustion exhaust gases of mainly coal containing sulfur oxides, HF and dust containing Al is provided, which process consists of four steps; a first step of contacting the gases with calcium carbonate or hydroxide in the form of slurry to convert the sulfur oxides into $CaSO_3$; a second step of contacting $O_2$ with the resulting slurry to convert $CaSO_3$ into $CaSO_4$; a third step of separating $CaSO_4$ and mother liquor from the resulting slurry; and a fourth step of preparing a slurry of calcium carbonate or hydroxide to be employed in the first step, from the mother liquor, the pHs of the slurry and the mother liquor in the first and fourth steps being adjusted to 5 or higher by adding alkali such as sodium carbonate.

According to the present process, it is possible to prevent hindrance of HF and Al contained in dust to the reaction of $SO_2$-absorbent ($CaCO_3$ or $Ca[OH]_2$) with $SO_2$ gas, and thereby improve percentage desulfurization and also obtain a high quality gypsum.

4 Claims, 7 Drawing Figures

PROCESS FOR DESULFURIZING COMBUSTION EXHAUST GASES

BACKGROUND OF THE INVENTION

Field of the Invention

The present invention relates to a process for desulfurizing combustion exhaust gases containing sulfur dioxide ($SO_2$), hydrogen fluoride (HF) and dust, and more particularly it relates to a process for preventing the reaction of limestone or slaked lime employed as an absorbent therefor with sulfur dioxide, from hindrance of HF and dust.

Recently coal has been used as a fuel for boilers of power stations or factories, because of the changes in the energy situation. Combustion exhaust gases of coal contain HF, dust and hydrogen hydrochloride (HCl), each in a concentration of about ten times those of combustion exhaust gases of heavy oil, and these components have various effects upon the desulfurization reaction. It has been known that among them, such metallic components as aluminum, contained in the dust have undesirable effects such that they inhibit the growth of gypsum crystal; they mix in gypsum as impurities to reduce the purity of gypsum; etc. Further, since HCl reacts with an absorbent of sulfur oxide such as quick lime to form calcium chloride ($CACl_2$), it increases the amount of absorbent used. Furthermore, since $CaCl_2$ reduces the dissolution rate of absorbent, it is necessary that the reaction time (retention time of slurry in the absorption step) is prolonged i.e. the capacity of slurry tank in the absorption step is increased in order to complete the desulfurization reaction.

Heretofore, there have been proposed various processes for solving these problems, such as a process of neutralizing metallic components to remove them in the form of floc of their hydroxides for the purpose of obtaining gypsum of a good quality (Japanese Patent Publication No. 10838/1977), and a process of adding magnesium salts to a slurry of absorbent for the purpose of preventing hindrance caused by HCl (Japanese Patent Application Laid-Open No. 17565/1978). Further a process of allowing dust not to be mixed in the absorption step by removing it prior to the absorption step, i.e. a so-called dust separation process, has been also proposed. This process, however, has a drawback that the apparatus therefor is corroded in the dust-removing step since the pH of the solution employed comes to be 2 or lower.

Further, the disposal of the dust thus separated also raises a problem.

SUMMARY OF THE PRESENT INVENTION

The object of the present invention is to provide a process of desulfurization without incurring the effect of HF and aluminum contained in dust in the process for desulfurization carried out under the condition where dust is mixed in the slurry.

In accordance with the present invention, there is provided a process for desulfurizing combustion exhaust gases which comprises;

a first step of contacting combustion exhaust gases containing sulfur oxides, hydrogen fluoride and dust containing aluminum with an absorbent such as calcium carbonate or calcium hydroxide in the form of slurry to convert said sulfur oxides into calcium sulfite;

a second step of contacting oxygen with the resulting slurry containing calcium sulfite to convert this slurry into a slurry containing calcium sulfate;

a third step of separating calcium sulfate and a mother liquor from said slurry containing calcium sulfate; and a fourth step of preparing a slurry of calcium carbonate or a slurry of calcium hydroxide to be employed in said first step, from said mother liquor, the pHs of the slurry and the mother liquor present in said first step and said fourth step being adjusted to 5 or higher by adding alkali.

In other words, the present invention resides in a process of desulfurization without incurring the hindrance of fluorine ion and aluminum ion contained in a slurry of absorbent by maintaining the pH of the slurry present in the absorption step at 5 or higher to thereby maintain the dissolution rate of the absorbent at a definite value or higher, even in a concentration of HF in the slurry, of 0.005 mol/l or higher, and also by making the pH of a mother liquor obtained by separating gypsum from the slurry of absorbent, 5 or higher to thereby decompose and remove the components hindering the dissolution of the absorbent, followed by employing again the resulting mother liquor in the absorption step or the preparation step of a slurry.

The concentration of HF in the slurry defined herein is calculated from the amount of HF absorbed in the slurry present in the absorption step and the amount of slurry withdrawn from the absorption step. HF thus absorbed is not always totally present in the form of HF in the slurry, but actually it is present in the solid phase or in the form of fluorine ion, as will be mentioned later.

DETAILED DESCRIPTION OF THE INVENTION

The present invention will be mentioned below in more detail.

Various processes for overcoming the drawbacks brought by the dust and HCl contained in the combustion exhaust gases of coal have been proposed, whereas what effect HF has upon the desulfurization reaction has not yet been known. The inventors of the present invention have made detailed studies on this effect of HF. Firstly, various combustion exhaust gases of coal having different compositions were desulfurized under the same conditions. As a result, it was found that the percentage desulfurization decreased when the exhaust gases were treated under the conditions where the concentration of HF in the absorbent slurry present in the absorption step reached 0.005 mol/l or more. Further, it was found that when the HF concentration in the slurry reaches 0.005 ml/l or higher, the aluminum component and HF in the dust react together to form aluminum ion in the slurry, and this aluminum ion, in turn, reacts with the absorbent together with fluorine ion to reduce the dissolution rate of the absorbent in the slurry. In the desulfurization reaction where solid fine particles of e.g. limestone, slaked lime, etc. are employed as the absorbents, since the reaction is accompanied with the dissolution step of the absorbent, it is necessary that the absorbent have a considerable dissolution rate.

Figure 1:
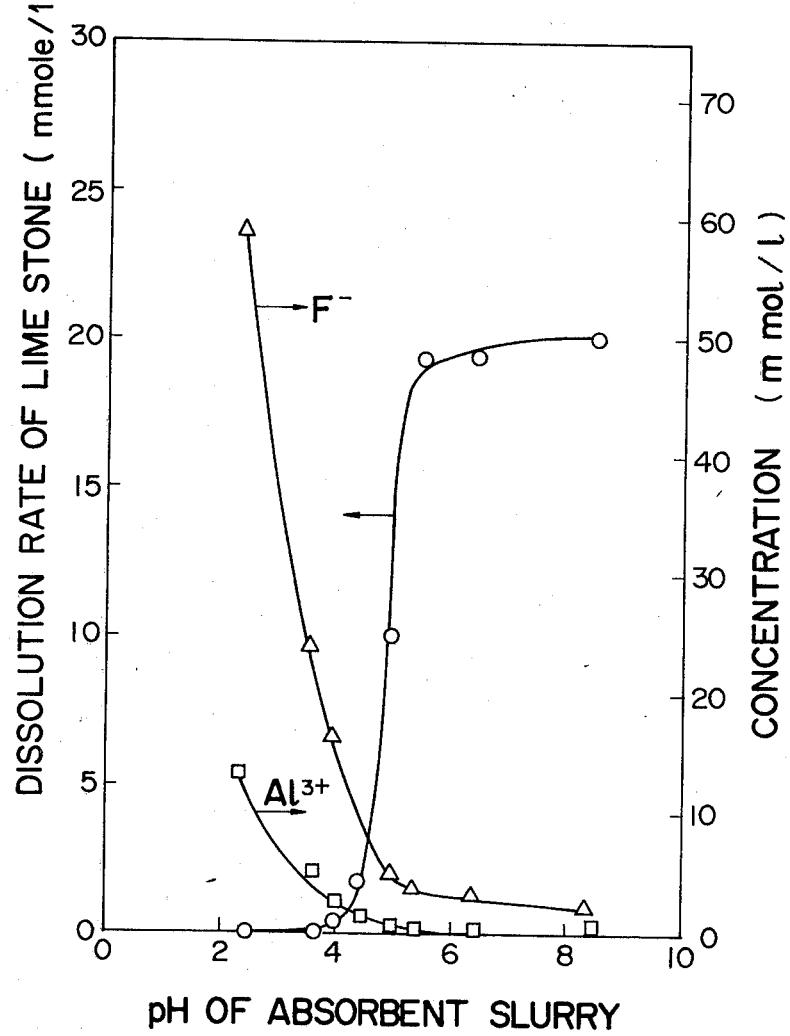
FIG. 1 is a diagram for illustrating a relationship between the pH of an absorbent slurry and the dissolution rates (or solubilities) of aluminum ion, fluorine ion, and limestone contained in the slurry.

Thus, the cause of reduction in the dissolution rate was further investigated. As a result, it was found that a water-insoluble compound (a sort of apatite) is formed on the surface of the absorbent due to the action of aluminum ion and fluorine ion. Further it was found that such reduction in the dissolution rate of the absorbent occurs when aluminum ion and fluorine ion are coexistent in the slurry, and also since the apatite is almost insoluble even in an strongly acidic solution of a pH of 3 or lower, when the apatite is once formed on the surface of the absorbent, it is impossible to employ the resulting absorbent for another desulfurization. Thus, the proportion of unreacted absorbent in the slurry was found to reach a value as high as 10%, for example. On the other hand, a remarkable reduction in the dissolution rate (solubility) of absorbent occurs at a pH of slurry lower than about 5, as shown in FIG. 1, and at that time, the concentration of aluminum ion corresponds to about 0.001 mol/l or higher, and that of fluorine, to about 0.005 mol/l.

As mentioned above, the principle of the present invention is based on the fact that when the pH of the slurry is maintained at a pH of 5 or higher, aluminum ion and fluorine ion cannot exist in the slurry to such an extent as hindering the dissolving reaction of the absorbent. Under the usual operational conditions in the absorption step, i.e. under the conditions where an absorbent in an amount corresponding to the amount of sulfur dioxide absorbed by contacting the exhaust gas with a slurry having a calcium concentration of 0.5 to 1.0 mol/l is withdrawn from the process, in the case where an exhaust gas having a HF concentration in the exhaust gas, of about 10 ppm or higher is desulfurized, the HF concentration in the slurry reaches 0.005 mol/l or higher to reduce the dissolution rate of the absorbent and hence reduce the percentage desulfurization. According to the present invention, an alkali is added to the slurry present in the absorption step for the purpose of neutralizing such HF, to maintain the pH of slurry at 5 or higher and thereby prevent the formation of aluminum ion. When an alkali is added so as to give a pH of slurry of 5 or higher, it is possible to neutralize HCl absorbed in the slurry together with HF. Further, an alkali can also be added to the mother liquor obtained in the separation step of gypsum so as to make the pH thereof 5 or higher and thereby remove aluminum ion in the mother liquor. The resulting mother liquor is utilized as a portion of an absorbent in the absorption step or in the preparation step of slurry.

As for the alkali added in the present invention, sodium carbonate, calcium hydroxide, sodium hydroxide, potassium hydroxide can be utilized. Among them, sodium carbonate is most preferrable. Calcium hydroxide is solid and apatite is inevitable to be formed on its surface, and hence unreacted calcium hydroxide remains inside its particles. Thus the amount thereof added reaches several times that of sodium carbonate. Further, such unreacted calcium hydroxide mixes in gypsum to reduce its purity. Sodium hydroxide and potassium hydroxide are stronger alkalies than sodium carbonate, so their handling is not easy. In the case current plants according to limestonegypsum desulfurization, these hydroxides are not present in the system, and hence equipments for storage and suppy thereof must be newly provided.

In the practice of the present invention, the following three typical embodiments are illustrated.

Figure 2:
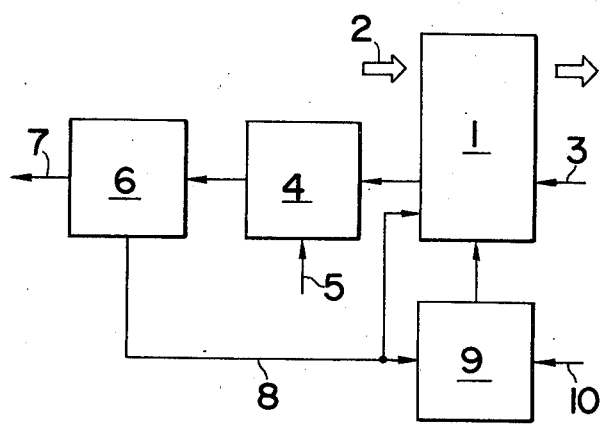
FIG. 2, FIG. 3 and FIG. 4 are block diagrams of preferred embodiments according to the present invention.

The first embodiment is shown in FIG. 2, which consists of an absorption step 2 corresponding to the abovementioned first step, and oxidation step 4 corresponding to the second step, a separation step of gypsum 6 corresponding to the third step, and a preparation step of slurry 9 corresponding to the fourth step. A gas 2 to be treated is fed to the absorption step 1 and contacted with a slurry of absorbent, which pH is adjusted by adding an alkali 3. In FIG. 2, numerals 5, 7, 8 and 10 show a oxygen-containing gas, gypsum to be discharged, a mother liquor to be recycled, and a slurry of absorbent such as limestone, respectively.

This embodiment is carried out in the case where the pH of slurry at the exit of the oxidation step 4 is 5 or higher, and in this case, since the concentration of aluminum ion in the mother liquor 8 is 0.001 mol/l or lower, the mother liquor 8 can be employed, as it is, in the preparation step of slurry 9. As for this embodiment, since the process of the present invention can be carried out by merely adding alkali to conventional apparatus, it is a particularly preferable one for the process of the present invention.

Figure 3:
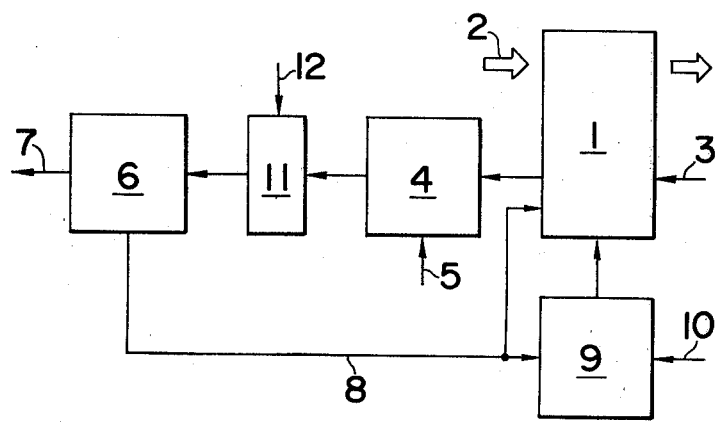

The second embodiment is shown in FIG. 3. This embodiment is carried out, unlike the first embodiment, in the case where the pH of slurry at the exit of the oxidation step 4 is lower than 5. A different point of this embodiment from the first is in that a pH-adjusting step 11 is provided between the oxidation step 4 and the separation step 6 of gypsum. In order to increase the oxidation reaction rate of calcium sulfite to calcium sulfate in the oxidation step 4, it is preferable to carry out the oxidation at as low as pH of slurry as possible, but the pH of slurry at the exit of an oxidation column often comes to be lower than 5. In this case, even if gypsum is separated from the slurry, 0.001 mol/l or higher of aluminum ion is contained in the mother liquor. Thus, if the mother liquor is employed directly in the preparation step 9 of slurry, apatite is formed on the surface of absorbent 10. In view of this point, according to this embodiment, alkali 12 is added to the pH-adjusting vessel 11 so as to give a pH of 5 or higher to the slurry. Aluminum contained in the slurry is precipitated, and then separated together with gypsum. The resulting mother liquor is returned to the preparation step 9 of slurry. Since aluminum precipitates mix with gypsum, the above second embodiment is carried out in the case where the oxidation rate of calcium sulfite is increased and the purity of gypsum 7 does not raise a problem so much.

Figure 4:
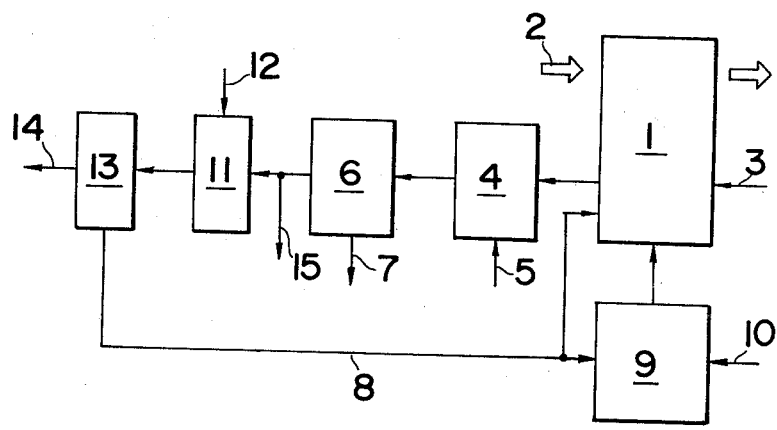

The third embodiment is shown in FIG. 4. This embodiment is also carried out in the case of a pH lower than 5, but unlike the second embodiment, since the pH-adjusting step 11 and aluminum separation step 13 is provided after the separation step of gypsum 6, no aluminum precipitates mix with gypsum. In FIG. 4, numerals 14 and 15 show aluminum precipitates and a drainage, respectively. The above embodiment is applied when gypsum of a good quality is desired to obtain.

The present invention will be concretely described by way of Examples.

EXAMPLE 1

Figure 5:
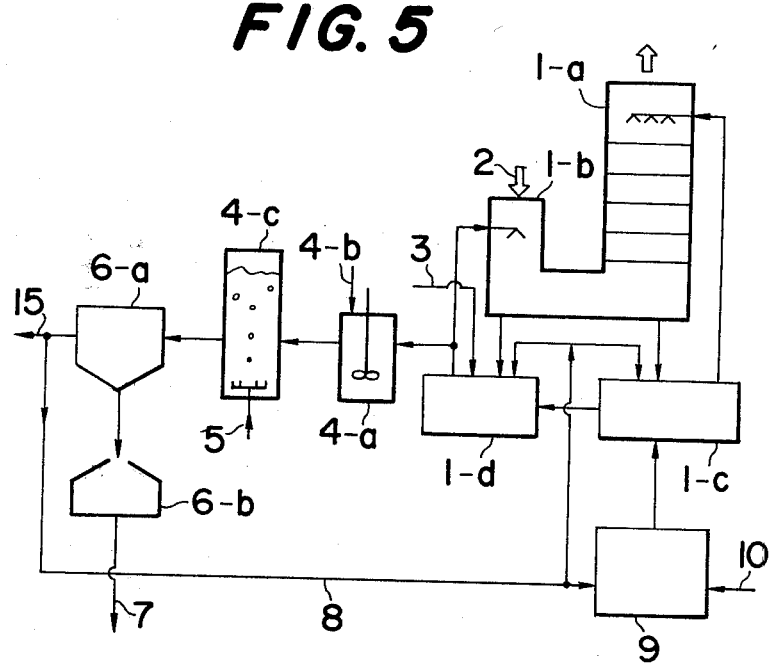
FIG. 5 is a view illustrating an apparatus employed in an experiment carried out based on the embodiment of FIG. 2.

This Example corresponds to the above-mentioned first embodiment, and FIG. 5 illustrates a desulfurization apparatus employed in an experiment therefor. A combustion exhaust gas 2 of coal containing 720 ppm of sulfur dioxide, 31 ppm of HF, 14 ppm of HCl, 9.1 wt. % of water, and 450 mg/Nm$^3$ of dust was fed to a cooling column 1b in a flow amount of 8800 Nm$^3$/h, and then led to an absorption column 1a where the gas was desulfurized. Calcium carbonate of 25 Kg/h (obtained by pulverizing limestone) as an absorbent 10 was fed to a preparation vessel 9 of slurry. The flow of the absorbent slurry are shown by arrow marks in FIG. 5. Sodium carbonate of 0.9 Kg/h as alkali 3 was fed to the tank 1d of the cooling column 1b to maintain the pH of the slurry contained therein at 5.4. Further, the calcium concentration in the slurry present in the cooling column 1b and the tank 1d thereof was made 0.9 mol/l, and the amount of slurry withdrawn to a reaction vessel 4a was made 270 l/h. At that time, the percent age absorption of HF in the cooling column 1b was measured to give 98%. In this regard, the HF concentration in the slurry, defined herein, was 0.041 mol/l. By adjusting the amount of sulfuric acid added in the reaction vessel 4a, the pH of the slurry was made 4.8. This slurry was fed to an oxidation column 4c to oxidize it. The pH of slurry at the exit of the oxidation column 4c was 6.0. This slurry was then fed to a thickner 6a where gypsum 7 and a mother liquor 8 were separated. Crude gypsum 7 was fed to a dehydrating apparatus 6b such as a centrifugal hydroextractor, where it was refined by washing, and then dehydrated. The mother liquor 8 was fed to a preparation vessel 9 of slurry where it was mixed with the absorbent 10 to prepare a slurry. Further, portions of the mother liquor 8 were supplied to the tank 1c of the absorption column and the tank 1d of the cooling column.

Under the above-mentioned conditions, change in the percentage desulfurization with proceeding of time was measured to give 94% one hour after the start of the experiment and 95% after 100 hours. Further, aluminum ion ($Al^{3+}$) concentration and fluorine ion ($F^-$) concentration in the slurry (pH: 6.1) of the absorption column 1c, after 100 hours, were 0.1 mmol/l and 2.5 mmol/l, respectively, while $Al^{3+}$ concentration and $F^-$ concentration in the slurry of the cooling column 1d were 0.4 mmol/l and 4.0 mmol/l, respectively.

COMPARATIVE EXAMPLE 1

Desulfurization was carried out in the same manner as in Example 1 except that no sodium carbonate was added to the cooling column 1b.

The percentage desulfurization with time was 94% at the initial period of the experiment, but it descreased down to 85% after ten hours, and 61% after 100 hours. Further, the pH, $Al^{3+}$ concentration and $F^-$ concentration of the slurry in the cooling column after 100 hours were 3.1, 8.0 mmol/l, 35 mmol/l, respectively, and those of the slurry in the absorption column were 4.4, 1.5 mmol/l and 12 mmol/l, respectively.

EXAMPLE 2

Figure 6:
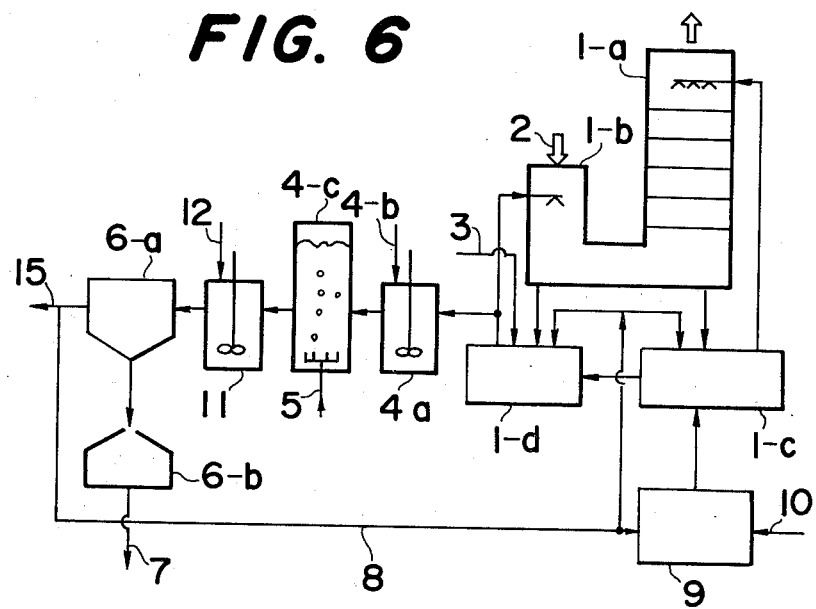
FIG. 6 is a view illustrating an apparatus employed in an experiment carried out based on the embodiment of FIG. 3.

This Example corresponds to the above-mentioned second embodiment shown in FIG. 3. Employing a desulfurizing apparatus shown in FIG. 6, a combustion exhaust gas of coal containing 1730 ppm of sulfur dioxide, 11 ppm of HF and 150 mg/Nm$^3$ of dust was desulfurized under the following conditions to give a percentage desulfurization of 95% one hour after the experiment and that of 96% after 100 hours;

| | |
|---|---|
| Cooling column 1-b | Amount of gas treated: 8800 Nm$^3$/h |
| | pH of slurry: 5.6 |
| | ($Al^{3+}$ 0.3 mmol/l, $F^-$ 3.5 mmol/l) |
| | Amount of calcium hydroxide added: 12 mol/h |
| | Amount of HF absorbed: 3.9 mol/h |
| | Amount of slurry discharged: 710l/h (Ca concentration in slurry: 0.82 mol/l) |
| | HF concentration in slurry: 0.0055 mol/l |
| Absorption column 1-a | Amount of calcium carbonate (lime) fed: 620 mol/h |
| | pH of slurry: 6.2 |
| | Others: perforated plates, 5 stages; liquid gas ratio L/G = 10l/Nm$^3$ |
| Reaction column 4-a | pH of slurry: 4.4 |
| Oxidation column 4-c | pH of slurry: 3.8 |
| pH-Adjusting vessel 11 | pH of slurry: 5.6 |
| Thickner 6-a | pH of mother liquor: 5.6 |
| Preparation vessel 9 of slurry | pH of slurry: 7.2 |

COMPARATIVE EXAMPLE 2

Desulfurization was carried out in the same manner as in Example 2 except that no calcium hydroxide was added to the tank 1c of the absorption column 1-2 and the pH-adjusting vessel 11. As a result, the percentage desulfurization at the initial period was 96%, but it decreased down to 59% after 100 hours. Further, the pH, $Al^{3+}$ concentration and $F^-$ concentration of the slurry in the cooling column 1b after 100 hours were 3.3, 6.8 mmol/l and 5.3 mmol/l, respectively, and those of the slurry in the absorption column 1a were 4.3, 2.1 mmol/l and 5.5 mmol/l, respectively.

EXAMPLE 3

Figure 7:
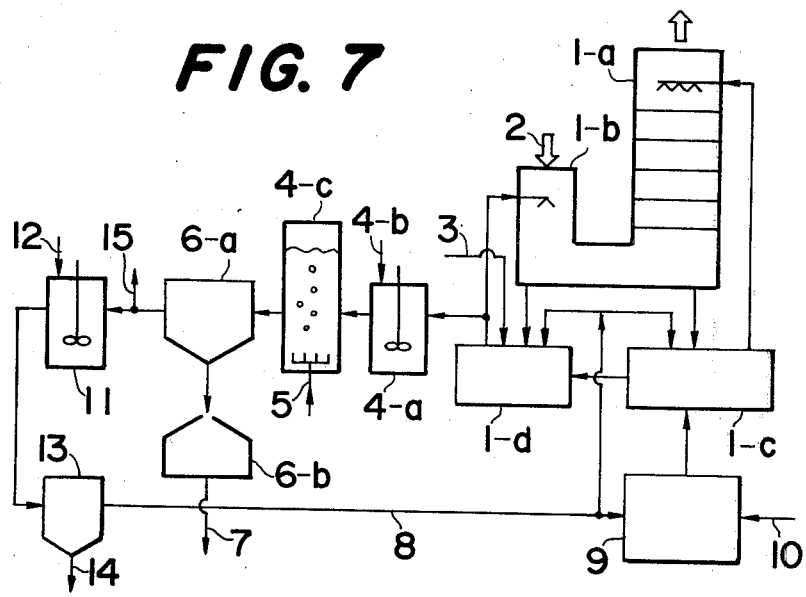
FIG. 7 is a view illustrating an apparatus employed in an experiment carried out based on the embodiment of FIG. 4.

This Example corresponds to the above-mentioned third embodiment shown in FIG. 4. Employing the desulfurizing apparatus shown in FIG. 7, a combustion exhaust gas 2 of coal, containing 1050 ppm of sulfur dioxide, 30 ppm of HF, 32 ppm of HCl and 320 mg/Nm$^3$ of dust was desulfurized under the following conditions to give a percentage desulfurization of 98% one hour after the start of the experiment and that of 95% after 100 hours.

| | |
|---|---|
| Cooling column 1-b | Amount of gas treated: 8800 Nm$^3$/h |
| | pH of slurry: 5.2 |
| | ($Al^{3+}$, 0.8 mmol/l; $F^-$, 3.8 mmol/l) |
| | Amount of sodium hydroxide added: 20 mol/h |
| | Amount of HF absorbed: 11 mol/h |
| | Amount of slurry withdrawn: 400l/h (Ca concentration in slurry: 0.9 mol/l) |
| | HF concentration in slurry: 0.027 mol/l |

| | |
|---|---|
| Absorption column 1-a | Amount of calcium hydroxide (slaked lime) fed: 370 mol/h<br>pH of slurry: 6.1<br>Others: perforated plates, 5 stages; liquid gas ratio L/G = 10 l/Nm$^3$ |
| Reaction vessel 4-a | pH of slurry: 4.3 |
| Oxidation column 4-c | pH of slurry: 3.5 |
| Thickner 6-a | pH of mother liquor: 3.5 |
| pH-adjusting vessel 11 | pH of slurry: 5.5 |
| Separation vessel 13 of aluminum | pH of mother liquor: 5.5 |
| Preparation vessel 9 of slurry | pH of slurry: 13.1 |

COMPARATIVE EXAMPLE 3

Desulfurization was carried out in the same manner as in Example 3 except that no sodium hydroxide was added to the tank 1d of the cooling column and the pH-adjusting vessel 11. As a result, the percentage desulfurization at the initial period was 97%, but it decreased down to 52% after 100 hours. Further, the pH, Al$^{3+}$ concentration and F$^-$ concentration of the slurry in the cooling column 1b after 100 hours were 3.3, 7.0 mmol/l and 27 mmol/l, respectively, while those of the slurry in the absorption column 1a were 4.1, 2.5 mmol/l and 15 mmol/l, respectively.

COMPARATIVE EXAMPLE 4

Desulfurization was carried out in the same manner as in Example 2 except that no calcium hydroxide was added to the tank 1d of the cooling column; the amount of slurry withdrawn was made 830 l/h; and HF concentration in the slurry was made 0.0047 mol/h, to give a percentage desulfurization at the start of the experiment, of 92% and that of 93% even after 100 hours. Further, the conditions of the respective reaction columns after 100 hours were as follows:

| | |
|---|---|
| Cooling column 1-b | Amount of gas treated: 8800 Nm$^3$/h<br>pH of slurry: 5.1<br>(Al$^{3+}$, 0.7 mmol/l;<br>F$^-$, 4.7 mmol/l)<br>Amount of HF absorbed: 3.9 mol/h |
| Absorption column 1-a | Amount of slurry withdrawn: 830 l/h<br>Ca concentration in slurry: 0.82 mol/l<br>HF concentration in slurry: 0.0047 mol/l<br>Calcium carbonate (limestone): 620 mol/l<br>pH of slurry: 5.8<br>Others: perforated plates, 5 stages; L/G = 10 l/Nm$^3$ |
| Reaction vessel 4-a | pH of slurry: 4.4 |
| Oxidation column 4-c | pH of slurry: 3.8 |
| pH-adjusting vessel 11 | pH of slurry: 56 |
| Thickner 6-a | pH of mother liquor: 5.6 |
| Preparation vessel 9 of slurry | pH of slurry: 7.1 |

What is claimed is:

1. A process for desulfurizing combustion exhaust gases which comprises:
    a first step of contacting combustion exhaust gases containing sulfur oxides, hydrogen fluoride and dust containing aluminum with calcium carbonate or calcium hydroxide in the form of slurry to convert said sulfur oxides into calcium sulfite;
    a second step of contacting oxygen with the resulting slurry containing calcium sulfite to convert this slurry into a slurry containing calcium sulfate;
    a third step of separating calcium sulfate and a mother liquor from said slurry containing calcium sulfate; and
    a fourth step of preparing a slurry of calcium carbonate or of calcium hydroxide to be employed in said first step, from said mother liquor, the pHs of the slurry and the mother liquor present in said first step and said fourth step being adjusted to 5 or higher by adding alkali selected from the group consisting of sodium carbonate, calcium hydroxide, sodium hydroxide, potassium hydroxide and mixtures thereof, thereby precipitating fluoride and dust containing aluminum removed from the combustion exhaust gases.

2. A process according to claim 1 wherein said combustion exhaust gases are those of coal.

3. A process according to claim 1 or claim 2 wherein said alkali is sodium carbonate.

4. A process according to claim 1, wherein said alkali is added after the second step, thereby precipitating fluoride and dust containing aluminum to be separated with the calcium sulfate in the third step.

* * * * *